US011695938B2

(12) United States Patent
Vensiyani et al.

(10) Patent No.: US 11,695,938 B2
(45) Date of Patent: Jul. 4, 2023

(54) METHOD AND APPARATUS FOR THUMBNAIL GENERATION FOR A VIDEO DEVICE

(71) Applicant: SLING MEDIA PVT LTD, Bangaluru (IN)

(72) Inventors: Abhilash Magan Vensiyani, Bangaluru (IN); Yatish Jayant Naik Raikar, Bangaluru (IN); Varunkumar B. Tripathi, Bangaluru (IN); Vivek Devaraj, Bangaluru (IN)

(73) Assignee: DISH Network Technologies India Private Limited

( * ) Notice: Subject to any disclaimer, the term of this patent is extended or adjusted under 35 U.S.C. 154(b) by 0 days.

(21) Appl. No.: 17/340,746

(22) Filed: Jun. 7, 2021

(65) Prior Publication Data

US 2022/0217360 A1 Jul. 7, 2022

(30) Foreign Application Priority Data

Jan. 5, 2021 (IN) .............................. 202141000391

(51) Int. Cl.
| | |
|---|---|
| *H04N 19/159* | (2014.01) |
| *H04N 19/12* | (2014.01) |
| *H04N 19/16* | (2014.01) |
| *H04N 19/423* | (2014.01) |
| *H04N 19/172* | (2014.01) |
| *H04N 19/169* | (2014.01) |

(52) U.S. Cl.
CPC ........... *H04N 19/159* (2014.11); *H04N 19/12* (2014.11); *H04N 19/16* (2014.11); *H04N 19/172* (2014.11); *H04N 19/188* (2014.11); *H04N 19/423* (2014.11)

(58) Field of Classification Search
None
See application file for complete search history.

(56) References Cited

U.S. PATENT DOCUMENTS

| | | | | |
|---|---|---|---|---|
| 2007/0291840 | A1* | 12/2007 | Tsuru | H04N 19/436 375/E7.199 |
| 2013/0336590 | A1* | 12/2013 | Sentinelli | G06F 16/739 382/218 |
| 2018/0124462 | A1* | 5/2018 | Lim | H04N 21/440245 |
| 2019/0318169 | A1* | 10/2019 | Hu | G06F 3/04883 |
| 2020/0404300 | A1* | 12/2020 | Seregin | H04N 19/46 |
| 2021/0185308 | A1* | 6/2021 | Wang | H04N 19/174 |
| 2021/0209812 | A1* | 7/2021 | Han | H04N 19/63 |
| 2022/0060732 | A1* | 2/2022 | Wang | H04N 19/188 |

* cited by examiner

*Primary Examiner* — Samuel D Fereja
(74) *Attorney, Agent, or Firm* — KW Law, LLP

(57) ABSTRACT

Systems and processes are provided to generate a thumbnail image including a tuner configured for receiving and demodulating a video signal including a video packet having a packet header and a video frame, a processor configured for generating a modified packet header by modifying the packet header to set a number of reference frames to zero and to designate the video frame as unused for reference, decoding the video frame in response to the modified packet header to extract the video frame, and generating the thumbnail image in response to the video frame, a memory configured for storing the thumbnail image, and a video output configured for coupling the thumbnail image to a display in response to a user video search request.

20 Claims, 5 Drawing Sheets

METHOD AND APPARATUS FOR THUMBNAIL GENERATION FOR A VIDEO DEVICE

TECHNICAL FIELD

The following discussion generally relates to the decoding of video on an electronic device and generation of preview image thumbnails. More particularly, the following discussion relates to minimizing a memory requirement for a video decoder and generating a plurality of low-resolution images in response to the decoded video.

BACKGROUND

Digital video programming is transmitted in an encoded format according to standardized formats, such as Advanced Television Systems Committee (ATSC) or Moving Picture Experts Group Four (MPEG-4), to compress the video data in order to reduce the amount of data required to be transmitted to transmit an audio/video signal. Decoding the video at a user device, such as a digital television or digital set-top box, typically requires a video decoder processor. As video increases in resolution, the decoding process requires increased processing resources and memory to decode the video. This may result in problems for legacy devices which employ earlier video decoders, slower processing speeds and limited memory for performing the decoding process.

When a user of a digital video device wishes to fast forward or rewind a video program, thumbnail images are typically displayed so that a user may know the current location in the video during the operation. The thumbnails are generated from the decoded video and for live video are generated as soon as the video data is available. Typically, digital video devices are only equipped with one video decoder and there is not a special thumbnail decoder available. Thus, decoding the video for thumbnails may double the processing requirements and/or memory requires as the video must be decoded as a normal high definition video. This presents a problem, especially on lower powered legacy devices, when a user wishes to advance or rewind a program and the digital video device unable to generate preview thumbnails due to a lack of resources. It is therefore desirable to create systems and methods to provide preview thumbnails on a digital video device to avoid these problems. Other desirable features and characteristics will become apparent from the subsequent detailed description and the appended claims, taken in conjunction with the accompanying drawings and this background section.

BRIEF SUMMARY

Disclosed herein are human machine interface methods and systems and related circuitry for provisioning computational systems, methods for making and methods for operating such systems, and system equipped with onboard control systems. By way of example, and not limitation, presented are various embodiments of thumbnail generation for video location preview in a video device.

In accordance with an aspect of the disclosure, a method for generating a thumbnail image including receiving an encoded video packet including a packet header and a video frame, generating a modified packet header by modifying the packet header to set a number of reference frames to zero and to designate the video frame as unused for reference, decoding the video frame in response to the modified packet header to extract the video frame, generating the thumbnail image in response to the video frame, and storing the thumbnail image in a memory.

In accordance with another aspect of the disclosure, an apparatus for generating a thumbnail image including a video input configured to receive an encoded video packet including a packet header and a video frame, a processor configured for generating a modified packet header by modifying the packet header to set a number of reference frames to zero and to designate the video frame as unused for reference, decoding the video frame in response to the modified packet header to extract the video frame, and generating the thumbnail image in response to the video frame, and a memory configured for storing the thumbnail image.

In accordance with another aspect of the disclosure, an apparatus for generating and transmitting a thumbnail image including a tuner configured for receiving and demodulating a video signal including a video packet having a packet header and a video frame, a processor configured for generating a modified packet header by modifying the packet header to set a number of reference frames to zero and to designate the video frame as unused for reference, decoding the video frame in response to the modified packet header to extract the video frame, and generating the thumbnail image in response to the video frame, a memory configured for storing the thumbnail image, and a video output configured for coupling the thumbnail image to a display in response to a user video search request.

The above advantage and other advantages and features of the present disclosure will be apparent from the following detailed description of the preferred embodiments when taken in connection with the accompanying drawings.

BRIEF DESCRIPTION OF THE DRAWING FIGURES

The exemplary embodiments will hereinafter be described in conjunction with the following drawing figures, wherein like numerals denote like elements, and wherein.

The exemplifications set out herein illustrate preferred embodiments of the disclosure, and such exemplifications are not to be construed as limiting the scope of the disclosure in any manner.

DETAILED DESCRIPTION

The following detailed description is intended to provide various examples, but it is not intended to limit the disclosure or the application and uses of the disclosure. Further-more, there is no intention to be bound by any theory presented in the preceding background or the following detailed description.

The general concepts described herein may be implemented in any connected device that may be used for video streaming or the like. For convenience of illustration, the following discussion often refers to a video signal processing device operative to generate video and/or video thumbnail information for presentation on a video display or the like. The actions taken in response to the generation of set top box video thumbnails may also be associated with the functionality of the mobile phones, portable electronic entertainment devices, and any other electronic media device capable of image or video display and/or playback. Additional details and examples are provided in the following description.

Figure 1:
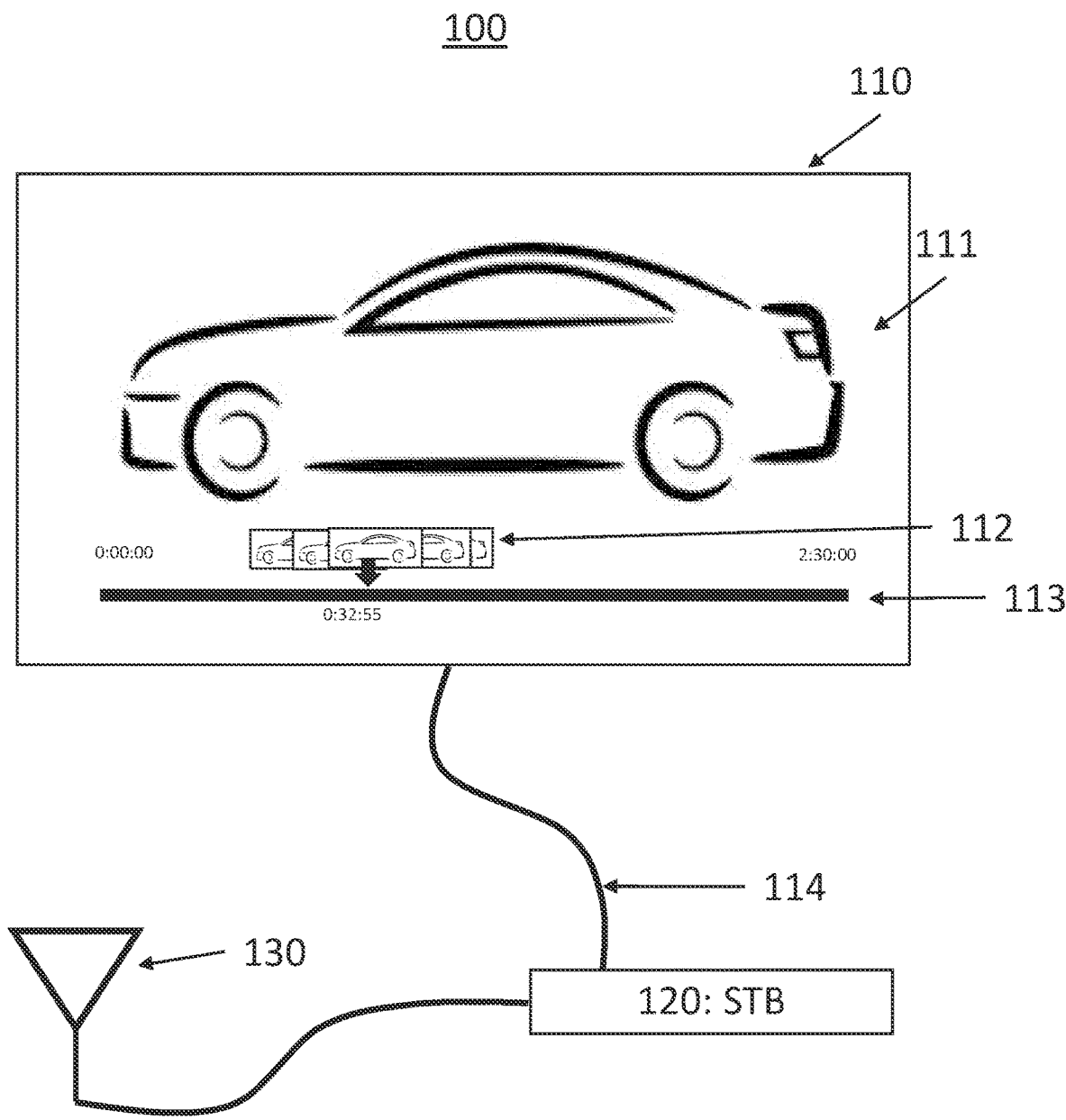
FIG. 1 shows an environment for thumbnail generation for a video device according to an exemplary embodiment of the present disclosure.

Turning now to FIG. 1, an environment for a system 100 for thumbnail generation in a video device according to an exemplary embodiment of the present disclosure is shown. The exemplary system 100 may include a display 110, a video set top box (STB) 120, and an antenna 130. According to an exemplary embodiment, the display 110 may be operative to display a video program 111, a video search bar 113 and one or more thumbnail 112 images representative or images within the video program.

In this exemplary embodiment, the STB 120 is operative to receive a video program via the antenna 130. Alternatively, the STB 120 may receive the video program via a transmission cable, such as a coaxial cable, a fiber optic cable, a wireless network connection or the like. The STB 120 may be operative to store the video program in an electronic format on a hard disk drive HDD or the like. The STB 120 may be operative to convert the video program from a first format, such as ATSC to a second format, such as MPEG-4 for program storage on the HDD.

The STB 120 may be further operative to generate a thumbnail file having a plurality of periodically timed images representative of locations within the video program. For example, the STB 120 may be operative to decode the stored video program, save a frame of the video program for every five seconds of video program run time. The frame may be stored as a JPEG image on the hard drive with a metafile storing information as to the name, location, video program indicator and time within the video program of the image. For example, for a one-minute video, the STB 120 may be operative to store 12 images representative of a frame of the video every five seconds. Typically for live video, thumbnail generation is performed as soon as the video data is available.

The STB 120 may advance the video program or rewind the video program in response to a request by a user. The user may be operative to generate the request in response to a button push on a remote control, a voice command, or the like. The STB 120 may then be operative to generate a user interface or an overlay over the image 111 to be displayed before coupling to the display 110. The user interface may include a progress bar 113 to display a current time location within the video program. When displaying the progress bar 113, the client 120 may be further operative to display a series of thumbnails 112 where the thumbnails are images representing frames in the video program situated at time locations before and after the current time location.

Figure 2:
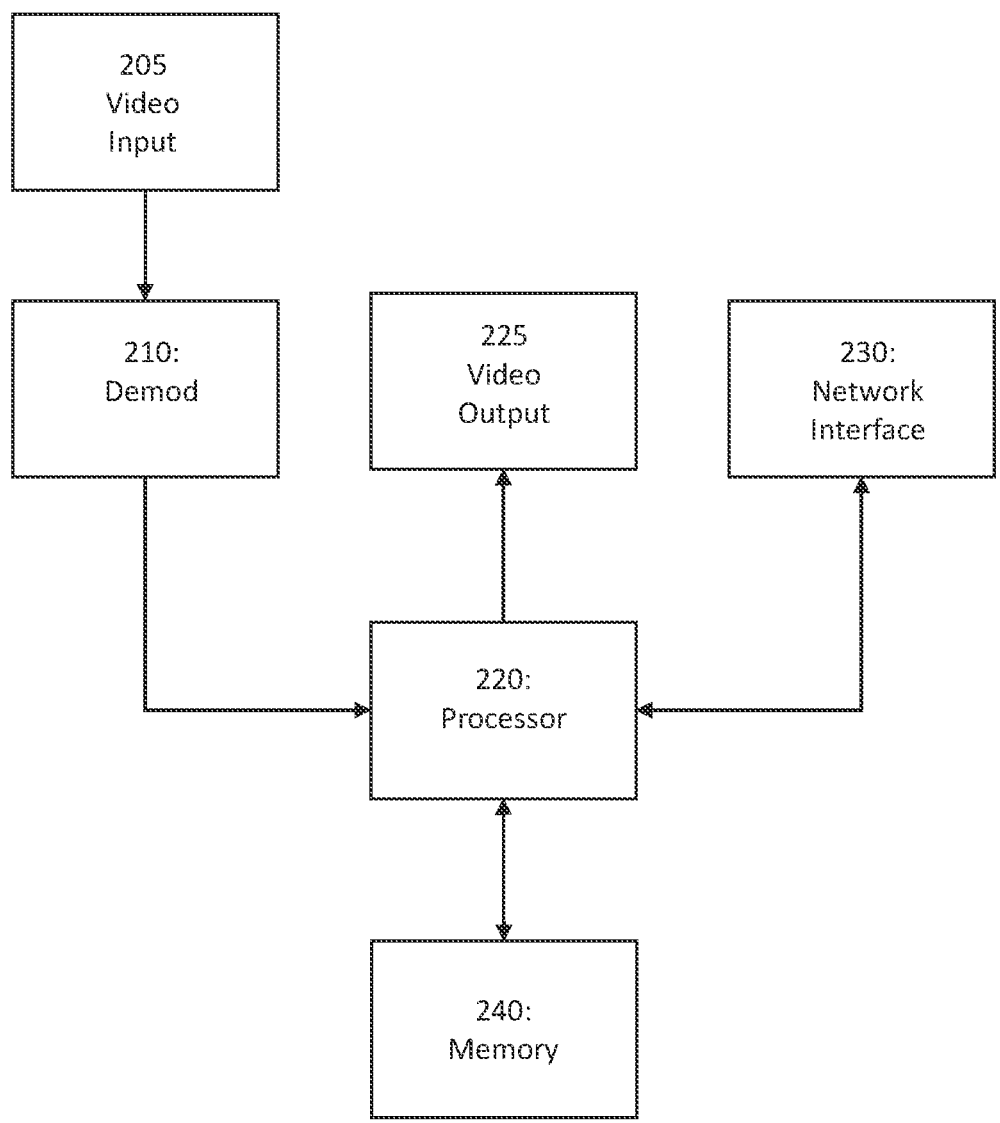
FIG. 2 shows a block diagram illustrating a system for thumbnail generation for a video device according to an exemplary embodiment of the present disclosure.

Turning now to FIG. 2, a system 200 for thumbnail generation for a video device according to an exemplary embodiment of the present disclosure is shown. The system 200 may include a video input 205, a demodulator 210, a processor 220, a video output 225, a network interface 230 and a memory 240. The video input 205 is operative to receive a video program and/or audio-visual program. The video input 205 may include a radio frequency or microwave tuner operative to receive a data representative of the video program modulated on a radio frequency or microwave carrier signal. Alternatively, the video input 205 may be a network interface operative to receive data formatted for network transport, such as TCP/IP and to extract the video program from the transport packets. The video input 205 may be a cable television tuner, or the like, operative to receive an ATSC, NTSC, or quadrature amplitude modulated (QAM) signal for transporting the video program. In this exemplary embodiment, the signal may be received via a cable television network, or satellite television network, or antenna-based network.

The demodulator 210 may be operative to receive the signal from the video input 205 and to demodulate the signal to generate a video signal in a format suitable for the processor 220. The demodulator 210 may be operative to demodulate the signal from the video input to extract the encoded video program and to couple the encoded video program to the processor 220. In an exemplary embodiment, the demodulator 210 may receive a QAM modulated signal to extract an MPEG-4 encoded signal which is then provided to the processor 220.

The processor 220 is operative to receive an encoded video signal from the demodulator 210 and to decode the encoded video signal to produce a signal suitable for coupling to the video output 225 for presentation on a display or the like. For example, the processor 220 may receive the video signal from the demodulator 210, decode the video signal using video compression techniques into a format such as H.264 or MPEG-4, and then store the compressed video file onto the memory 240. The processor 220 may be further operative to retrieve the compressed video file in response to a user request and to couple the video signal to the video output 225 or the like. In addition, the processor 220 may be operative to couple the video file to the network interface 230 for transmission to a client device in response to a request from the client device. In an exemplary embodiment, the processor 220 may control streaming of the video file in a video streaming format for coupling to the client device via the network interface 230.

In addition, the processor 220 is operative to generate a thumbnail file for the compressed video file and to store the thumbnail file on the memory 240. Thumbnails for streaming and broadcast services are a standard requirement these days. The thumbnails help a user to navigate faster within the content and helps in skipping the content which is unsuitable or undesirable for the viewing audience. To generate the preview thumbnails of the video program, the processor 220 is operative to read the first frame of the stored video program and to determine if the frame is an I-frame, also known as an intra-frame. If the frame is an I-frame, or a complete image frame, the processor 220 then determines if the elapsed video time has exceeded a minimum duration. A thumbnail may be generated as a predetermined minimum interval in order to reduce the number of thumbnails being generated. If the frame is an I-frame and the time since generating the previous thumbnail is greater than the threshold interval, the processor 220 then decodes the frame and encodes the image as a compressed image, such as a JPEG. The processor 220 may further be operative to resize the image and/or decrease the image resolution to reduce the image size for storage and transmission. The processor 220 is then operative to store the image on the memory. The processor 220 may further be operative to generate or append a metafile indicative of the set of thumbnail images generated for the video program. The data stored in the metafile may include frame pts, byte offset which may be the byte offset of the thumbnail in the mtn file, thumbnail file size, the frame or file offset in the file, thumbnail file name, and/or timestamp in milliseconds.

In an STB used for receiving live broadcasts, effective management of system resources is critical to ensure good quality video production. Thumbnail generation for the ongoing live program is required, but the additional overhead computation and memory requirements which should not impact the primary video viewing experience of the user by excessive consumption of system resources like memory. When generating a thumbnail image, the same video processing algorithms are often used for the main video stream and the thumbnail generations. These video processing algorithms are computationally intense and may require large amounts of memory to perform. As video content increases in resolution, frame rate, and the like, this problem is exacerbated. When generating the thumbnail images by the processor 220, it is desirable to reduce the computational and memory requirements, especially in legacy systems, by providing a reduced memory footprint approach for thumbnail generation by bitstream manipulation. To ensure minimal memory footprint in the STB when generating thumbnails, the processor 220 is configured for modifying the input bitstream to consume lower memory while ensuring the bitstream is syntactically compliant resulting in no errors. The processor 220 may modify the bitstream by reducing the number of references frames used to generate the thumbnails, concatenation of the frames and/or modification to the slice header such that no frames are cached in the decoded picture buffer.

In one exemplary embodiment, the processor 220 may be configured to reducing the number of reference frames used to generate the thumbnail images. For example, for H.264 streams, only I-frame are used the decoder for generating thumbnails as they are independently decodable, unlike predicted (P) frames or a bidirectional predicted (B) frames. Sequence Parameter Set (SPS) headers in H.264 encoded frames include a field specifying the maximum number of reference frames for this H264 stream. When the video decoder is provided with the first frame, the video decoder frame reads this specified maximum number of reference frames and allocates memory for the specified number of frames, usually between 3 to 5 frames. However, this memory is allocated for subsequent frames that will require successful decode for video playback. Thumbnail generation does not require the successful decoding of P and B frames, hence this extra memory allocated for 3 to 5 frames is not required. To address this extra memory, a new SPS header is constructed to modify the specified number of frames to zero and replace this header in the H264 encoded frame before providing it to the decoder. With the modified header, the decoder algorithm infers that all the frames in the stream are I-frames which are independently decodable and does not allocate memory for other frames. For example, for 1920*1080 video with YUV 4:2:0 sub-sampling, 1 frame will require 1920*1080*1.5=2.97 MegaBytes. So if the max number of frames is 4, the total memory decoder will allocate is 4*2.97=11.88 MB. This 11.88 MB will be extra memory which will not be allocated after modifying the SPS header in H264 encoded frames such that the max number of frames is zero.

The processor 220 may be configured to reduce the required memory by performing frame concatenation. As frames are applied to the video decoding algorithm, care needs to be taken to apply complete frames. As we are selectively feeding frames to the video processor 220, partial frames may result in error being thrown by the decoding process which in some cases results in additional memory being required. The video encoding should be performed in either frame mode such that the full frame is encoded as one, or in field mode where the frame is encoded as two fields. For example, using the FFmpeg decoder, the encoding mode is determined by going through the slice header and checking "field_pic_flag". So if field_pic_flag=0, we fed the frames directly to FFmpeg. In the case case where field_pic_flag=1, the two consecutive fields may be concatenate the two consecutive fields to make up one complete frame which is then provided to the decoder. This concatenation of the two consecutive fields allows for the feeding of selective frames even when video was encoded in field mode.

The processor 220 may be further configured for modifying the slice header such that all frames in the decoded picture buffer (SPB) are subsequently marked as unused for reference and are flushed out of the DPB. P and B frames depend on other I and P frames to be successfully decoded. When generating thumbnails, the exemplary system employs only Intra-coded (I) frames which are independently decodable. Since the dependent P and B frames are not decoded for thumbnail generation, the buffering of these I-frames is not required. All I and P frames are used as reference to decode other frames in the GOP (Group of Pictures) structure. A field in the slice header, such as "memory_management_control_operation," is used to specify which action should be taken for all the frames currently in DPB. This field may be modified such that all frames fed to the decoder, which are all I-frames for the thumbnail generation, are labeled as "unused for reference." Subsequently all the frames in the DPB including the current I-frame will be marked as "unused for reference" and will be flushed out of DPB, freeing the DPB for future frames. Because we are already modifying "max_num_ref_frame" in SPS to 0, the current frame will be the only part of DPB. In one exemplary embodiment, for 1920*1080 video with YUV 4:2:0 sub-sampling, 1 frame will require 1920*1080*1.5=2.97 Megabytes. Modifying the slice header in H264 encoded frames to mark all frames as "unused for reference" will reduce the memory requirements by 2.97 MB worth of RAM in runtime resulting in 2.97 MB of extra unallocated memory.

The processor 220 is further operative to receive a request from a client device via the network interface 230 requesting a subset of the thumbnails in response to a video search operation, such as rewinding or fast forwarding the video. The request may indicate the video program being viewed, the location or time progress within the video program and a direction and speed of the search operation being performed. The processor 220 may then couple the determined thumbnails corresponding to the video program, time progress, and speed and couple these thumbnail images to the network interface 230 for transmission to the client. The processor 220 may further generate a metafile indicative of the thumbnail images and information related to the thumbnail images and couple this metafile to the network interface 230 for transmission to the client.

The network interface 230 is operative to transmit and receive data from client devices on a network. For example, the network interface 230 may be part of a DVR and is operative to receive requests from one or more client devices on a network. The network interface 230 is then operative to transmit a list of available programs, a requested program, a thumbnail data file, or other information to a client device in response to a request from the client device. The network interface 230 may communicate directly with the client device or may communicate via a network router on a wireless local area network, such as a Wi-Fi network.

Figure 3:
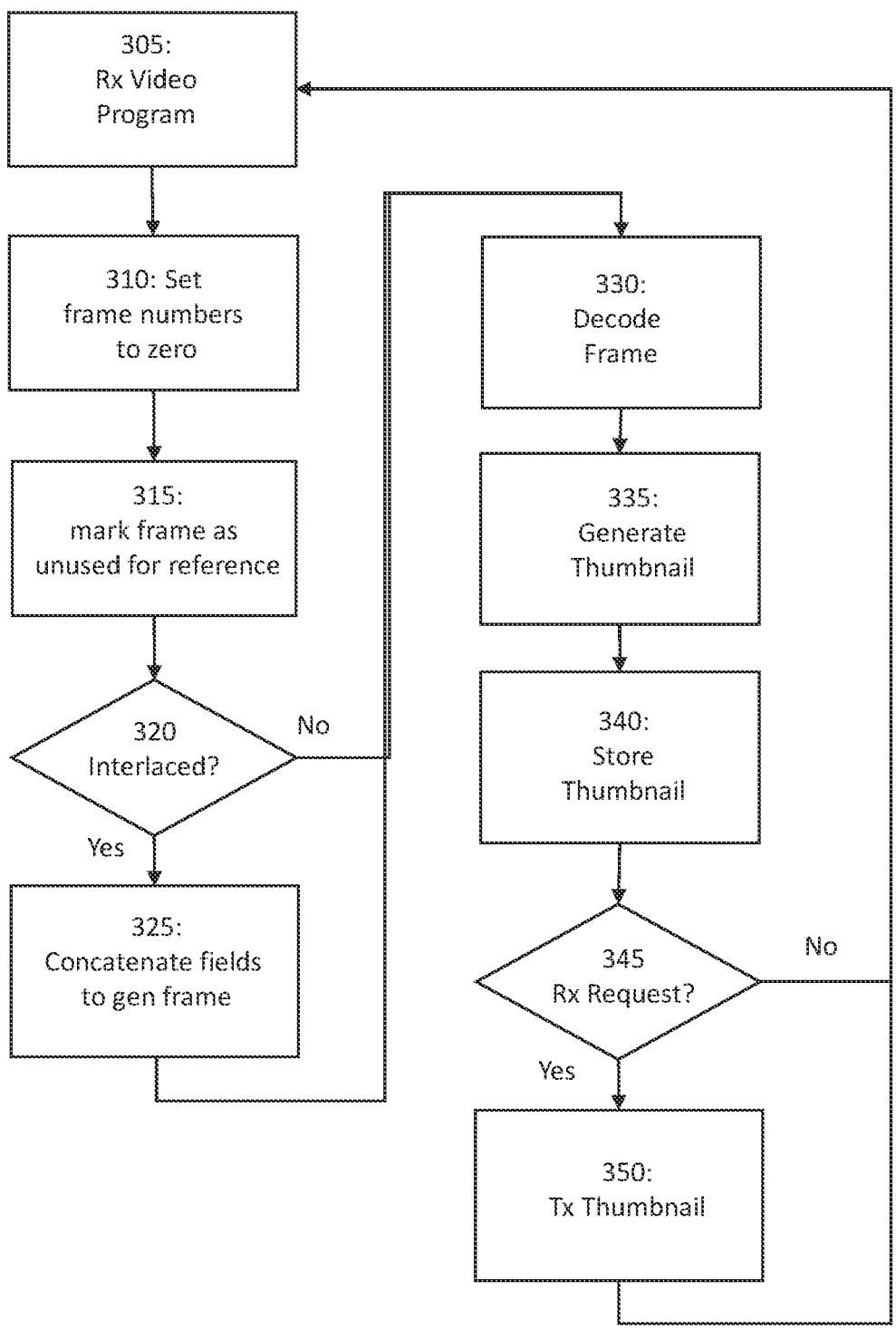
FIG. 3 shows a flowchart illustrating a method for thumbnail generation for a video device according to an exemplary embodiment of the present disclosure.

Turning now to FIG. 3, a method 300 for thumbnail generation for a video device according to an exemplary embodiment of the present disclosure is shown. The method is first operative to receive 305 a video program via a network interface, video input or the like. The video program may be transmitted via a radio frequency or microwave frequency carrier signal and transmitted via wireless or wired transmission means. In one exemplary embodiment, the video program may be received via a satellite transmission and received at a parabolic antenna equipped with a low noise block amplifier and downconverter. The video stream may be received in packets having header information. The method is configured to alter the header information of the incoming video stream to minimize the computational load and memory used by the video decoder.

In response to receiving a packet of the video stream, the method is next operative to modify 310 the header of the packet to change the number of frames specified to be stored in memory for decoding of subsequent frames. Since the exemplary method for generating thumbnail images uses only I frames which require no prior frames for decoding, the specified number of frames is modified to zero. This reduces the memory required for generating thumbnails in response to the video program. For example, for H.264 decoding, a new SPS header is constructed to modify the specified number of frames to zero and replace this header in the H264 encoded frame before providing it to the decoder.

The method in next operative to modify 315 the slice header to mark all frames as unused for reference. A slice is a spatially distinct region of a frame that is encoded separately from any other region in the same frame. Since only I-frames are utilized in generating the thumbnail images no additional frames in the group of pictures (GOP), or slices, are required for decoding. In one exemplary embodiment for H.264, the memory management control operator in I-Frame header is modified to designate all reference frames as unused for reference. Therefore, all frames including the current I-Frame will be flushed from the DPB preventing unused memory from being allocated within the decoder.

The method is next configured to determine 320 if the frame is an interlaced frame. If the frame is interlaced, the frame arrives as two fields. Since only I-frames are being fed to the decoder and not P and B frames, an interlaced frame results in feeding a partial frame to the decoder. Feeding a decoder partial frames may result in an error being generated by the decoder which in some cases results in additional memory getting consumed by the decoder. In one exemplary embodiment, the encoding mode may determined by going through the slice header and checking "field_pic_flag". If field_pic_flag=0, we fed the frames directly to the decoder. If field_pic_flag=1, the frame is an interlaced frame. If the frame is an interlaced frame, the method is next configured to concatenate 325 two consecutive fields to generate a complete frame. This complete frame is then provided to the decoder.

The method is then configured 330 to decode the video frame to generate a video image. For example, the video frame may be decoded according to the H.264 standard. The method the generates a thumbnail in response to the video image or the decoded frame. In one exemplary embodiment, a thumbnail may be generated for a specified time interval within the video program, such as every 20 seconds. The method determines if an elapsed time between frames is greater than elapsed time threshold, where the elapsed time threshold is a minimum time between thumbnails, in order to limit the number of thumbnails being generated and the memory required to store the thumbnails. If the elapsed time between frames is not greater than elapsed time threshold, the method is operative to return to read the next frame in the video program. The method may resize the image and/or decrease the image resolution to reduce the image size for storage and transmission.

The method then stores 340 the thumbnail in a memory, a hard disk drive or other storage medium. In one exemplary embodiment, the method may be operative to generate a multi-thumbnail file (MTN) and to append the image to the MTN. As an alternative to storing the image as an individual thumbnail, the use of the concatenated MTN reduces memory requirements on the hard disk drive to block alignment and the like. The method is then operative to append metadata to image file and to return to read next fame of the video program.

In another exemplary embodiment, the method may receive 345 a request for the thumbnail in response to a user video search request. The user video search request may be a fast-forward video search or a rewind video search or the like. If a request is received, the method may then transmit 350 the thumbnail to the display processor, display algorithm or the like. The display algorithm may then display one or more thumbnails on the display.

Figure 4:
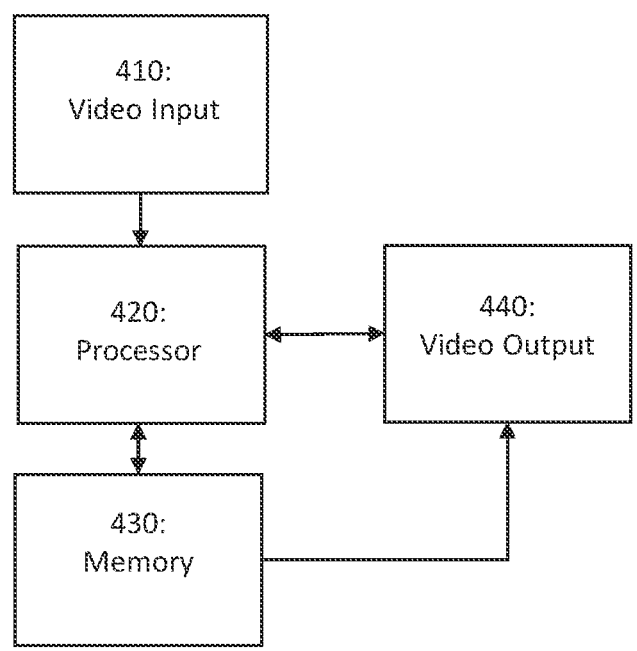
FIG. 4 shows a block diagram illustrating a system for thumbnail generation for a video device according to an exemplary embodiment of the present disclosure

Turning now to FIG. 4, a system 400 for thumbnail generation for a video device according to an exemplary embodiment of the present disclosure is shown. The exemplary system 400 may include a video input 410, a processor 420, a memory 430 and a video output 440. The exemplary system 400 is configured for generating a video preview thumbnail from a video stream as efficiently as possible in order to reduce the computational and memory requires of the video decoder and the video device.

The video input 410 may be configured to receive an encoded video packet including a packet header and a video frame. The video input may be a radio frequency or microwave tuner and demodulator for receiving and decoding an ATSC or QAM signal. Alternatively, the video input may be a network interface for receiving a video program via a data network, such as the interne, local area Wi-Fi network or the like. In one exemplary the encoded video packet is encoded according to the H.264 standard.

The processor 420 may be a video signal processor, or the like, configured for generating a modified packet header by modifying the packet header to set a number of reference frames to zero and to designate the video frame as unused for reference, decoding the video frame in response to the modified packet header to extract the video frame, and generating the thumbnail image in response to the video frame. The processor 420 may be configured for determining the video frame is a first field of an interlaced frame, receiving a second field of the interlaced frame, concatenating the first field and the second field to generate a complete frame. In this example of interlace encoded video, the processor may the decoded the complete frame generated from the first field and the second field.

In one embodiment, the processor 420 may be configured to determine if the video frame is an intra-frame video frame, a predicted frame or a bidirectional predicted frame. The processor 420 may then decoded the intra-coded frame and not decode and/or discard any P-frames and B-frames. When generating the thumbnail image, the processor 420 may scale the video frame image such that the thumbnail image has a lower resolution than the video frame.

The memory 430 configured receiving the thumbnail image from the processor 420 and for storing the thumbnail image. The memory 430 may be a hard disk drive, random access memory or other electronic storage medium. The memory 430 may be configured for providing the thumbnail image to the processor 420 and/or the video output in response to a request. For example, the video output 440 may be configured for coupling the thumbnail image to a video display in response to a user video search request.

In one exemplary embodiment, the system 400 is a digital video recorder for generating and transmitting a thumbnail image wherein the video input 410 includes a tuner configured for receiving and demodulating a video signal including a video packet having a packet header and a video frame. The processor 420 includes a digital signal processor configured for generating a modified packet header by modifying the packet header to set a number of reference frames to zero and to designate the video frame as unused for reference, decoding the video frame in response to the modified packet header to extract the video frame, and generating the thumbnail image in response to the video frame. The memory 430 may be a hard disk drive configured for storing the thumbnail image. The hard disk drive may further store a decoded video program associated with the thumbnail image. The exemplary video output 440 may be configured for coupling the thumbnail image to a display in response to a user video search request. The thumbnail image may be coupled to the display via a baseband video signal, a wireless network transmission, such as a Wi-Fi network, or a modulated or radio-frequency transmission channel. In addition, the exemplary processor 420 may be further configured for determining the video frame is a first field of an interlaced frame, receiving a second field of the interlaced frame, concatenating the first field and the second field to generate a complete frame and wherein decoding the video frame includes decoding the complete frame.

Figure 5:
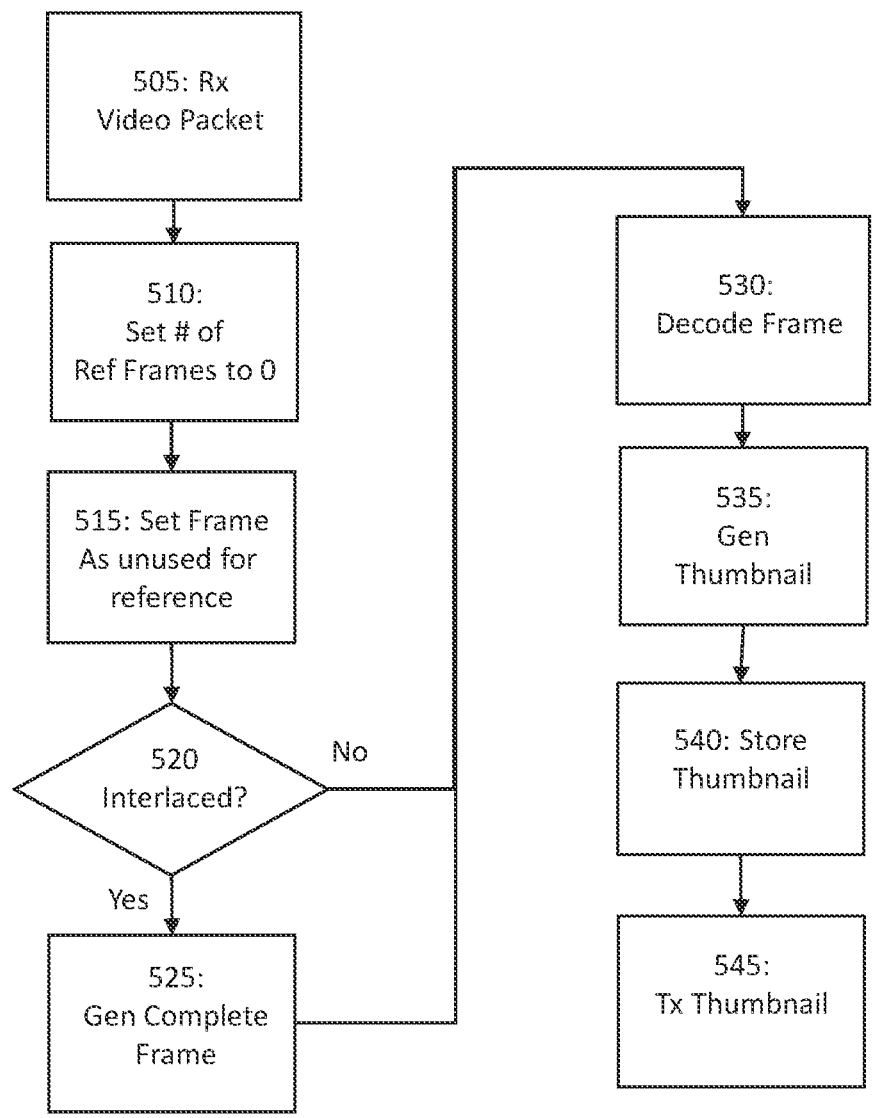
FIG. 5 shows a flowchart illustrating a method for providing thumbnail images in response to a request from a client device according to another exemplary embodiment of the present disclosure.

Turning now to FIG. 5, a method 500 for thumbnail generation for a video device according to an exemplary embodiment of the present disclosure is shown. The method is operative to generate a video preview thumbnail in response to an image from a decoded video frame. The method is first operative for receiving 505 an encoded video packet including a packet header and a video frame. the encoded video packet is encoded according to the H.264 standard.

In response to receiving the encoded video packet, the method 500 modifies 510 the packet header and setting the number of reference frames to zero. The number of reference frames is set to zero so no additional frames are retained in memory for subsequent decoding, such as P-frames and B-frames. In addition, the header is modified 515 to designate the video frame as unused for reference. The slice header may be configured such that the current frame is removed from memory and the memory flushed for the next frame after the thumbnail image has been generated.

The method is next operative for determining 520 if the video frame is a first field of an interlaced frame, receiving a second field of the interlaced frame, concatenating the first field and the second field to generate 525 a complete frame and wherein decoding the video frame includes decoding the complete frame. Alternatively, the compete frame by be generated in response to determining the video frame is a first field of an interlaced frame by generating a second field and concatenating the first field and the second field. The second field may be generated in response to data within the first field, such as duplicating the data and offsetting the data, or the second field may be generated from random or null pixel data. The decoding according to the modified header data is then performed using the complete frame.

The video frame is next decoded 530 decoding the video frame in response to the modified packet header to extract the video frame. In an exemplary embodiment, the video frame is decoded in response to the video frame being an Intra-coded frame. According to this embodiment, the video frame is discarded if the video frame is a predicted frame or a bidirectional predicted frame.

The method is next operative for generating 535 the thumbnail image in response to the video frame. In one embodiment, generating the thumbnail image may include scaling the video frame such that the thumbnail image has a lower resolution than the video frame. In addition, the method may only generate thumbnails for predefined time intervals of the video program, so the exemplary method determines if the time interval has been met or exceeded and, if so, generates the thumbnail image. If the time interval has not been met or exceeded, the method may discard the video frame.

The thumbnail is next stored 540 in a memory. The thumbnail may be one of a plurality of thumbnail images generated from video frames from predetermined intervals of the video program, such as every 10 seconds. The memory may a hard disk drive, a random access memory, or any other electronic media storage device. The method may be further configured for coupling 545 the thumbnail image to a video display in response to a user video search request. The user video search request may be generated in response to a user requesting a fast forward, rewind, or other video searching operation.

The term "exemplary" is used herein to represent one example, instance or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the disclosure in any way. To the contrary, various changes may be made in the function and arrangement of the various features described herein without departing from the scope of the claims and their legal equivalents.

The invention claimed is:

1. A method for generating a thumbnail image comprising:
   receiving an encoded video packet including a packet header and a video frame comprising an i-frame;
   generating a modified packet header by setting a value of max_num_ref_frames to zero in the packet header and designating the i-frame as unused for reference in the packet header by setting a value of memory_management_control_operation to avoid caching the i-frame in a decoded picture buffer;
   decoding the i-frame in response to the modified packet header to extract the i-frame;
   generating the thumbnail image comprising the video frame; and
   storing the thumbnail image directly in a memory in response to the value of max_num_ref_frames and the value of memory_management_control_operation.

2. The method for generating a thumbnail image of claim 1, including determining the video frame is a first field of an interlaced frame, receiving a second field of the interlaced frame, concatenating the first field and the second field to generate a complete frame and wherein decoding the video frame includes decoding the complete frame.

3. The method for generating a thumbnail image of claim 1, including coupling the thumbnail image to a video display in response to a user video search request.

4. The method for generating a thumbnail image of claim 1, wherein the encoded video packet is encoded according to the H.264 standard.

5. The method for generating a thumbnail image of claim 1, wherein the memory is a hard disk drive.

6. The method for generating a thumbnail image of claim 1, wherein the video frame is decoded in response to the video frame being an Intra-coded frame.

7. The method for generating a thumbnail image of claim 1, wherein the video frame is discarded in response to the video frame being one of a predicted frame, a bidirectional predicted frame, and an inline frame within a generation interval.

8. The method for generating a thumbnail image of claim 1, wherein generating the thumbnail image includes scaling the video frame such that the thumbnail image has a lower resolution than the video frame.

9. The method for generating a thumbnail image of claim 1, including determining the video frame is a first field of an interlaced frame, generating a second field in response to the first field, concatenating the first field and the second field to generate a complete frame and wherein decoding the video frame includes decoding the complete frame.

10. An apparatus for generating a thumbnail image comprising:
a video input configured to receive an encoded video packet including a packet header and a video frame;
a processor configured for generating a modified packet header by modifying the packet header to set a value of max_num_ref_frames to zero in the packet header and designating the video frame as unused for reference in the packet header by setting a value of memory_management_control_operation, decoding the video frame in response to the modified packet header to extract the video frame, and generating the thumbnail image comprising the video frame; and
a memory configured for storing the thumbnail image by bypassing a decoded picture buffer in response the value of max_num_ref_frames and the value of memory_management_control_operation.

11. The apparatus for generating a thumbnail image of claim 10, wherein the processor is further configured for determining the video frame is a first field of an interlaced frame, receiving a second field of the interlaced frame, concatenating the first field and the second field to generate a complete frame and wherein decoding the video frame includes decoding the complete frame.

12. The apparatus for generating a thumbnail image of claim 10, further comprising a video output configured for coupling the thumbnail image to a video display in response to a user video search request.

13. The apparatus for generating a thumbnail image of claim 10, wherein the encoded video packet is encoded according to the H.264 standard.

14. The apparatus for generating a thumbnail image of claim 10, wherein the memory is a hard disk drive.

15. The apparatus for generating a thumbnail image of claim 10, wherein the video frame is decoded in response to the video frame being an Intra-coded frame.

16. The apparatus for generating a thumbnail image of claim 10, wherein the processor is further configured for discarding the video frame in response to the video frame being one of a predicted frame and a bidirectional predicted frame.

17. The apparatus for generating a thumbnail image of claim 10, wherein the processor is further configured for scaling the video frame such that the thumbnail image has a lower resolution than the video frame.

18. Apparatus for generating a thumbnail image of claim 10, wherein the processor is further configured for determining the video frame is a first field of an interlaced frame, generating a second field in response to the first field, concatenating the first field and the second field to generate a complete frame and wherein decoding the video frame includes decoding the complete frame.

19. An apparatus for generating and transmitting a thumbnail image comprising:
a tuner configured for receiving and demodulating a video signal including a video packet having a packet header and a video frame;
a processor configured for generating a modified packet header by modifying the packet header to set a value of max_num_ref_frames to zero and to designate the video frame as unused for reference by setting a value of memory_management_control_operation, decoding the video frame in response to the modified packet header to extract the video frame, and generating the thumbnail image in response to comprising the video frame;
a memory configured for storing the thumbnail image by bypassing a decoded picture buffer in response the value of max_num_ref_frames and the value of memory_management_control_operation; and
a video output configured for coupling the thumbnail image to a display in response to a user video search request.

20. The apparatus for generating and transmitting a thumbnail image of claim 19 wherein the processor is further configured for determining the video frame is a first field of an interlaced frame, receiving a second field of the interlaced frame, concatenating the first field and the second field to generate a complete frame and wherein decoding the video frame includes decoding the complete frame.

* * * * *